Oct. 19, 1948.  A. M. WICKWIRE ET AL  2,452,008
MERCURY CLUTCH
Filed March 2, 1945  4 Sheets-Sheet 1

Inventors
Arthur M. Wickwire
& Hans J. Zimmermann
By Frease & Bisher
Attorneys

Oct. 19, 1948.  A. M. WICKWIRE ET AL  2,452,008
MERCURY CLUTCH
Filed March 2, 1945  4 Sheets-Sheet 2

Inventors
Arthur M. Wickwire &
Hans J. Zimmermann
Fraser & Bishop Attorneys

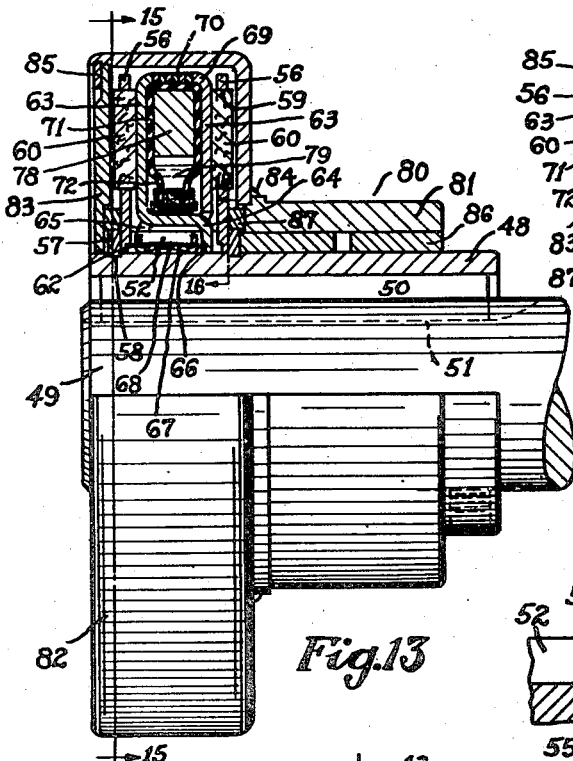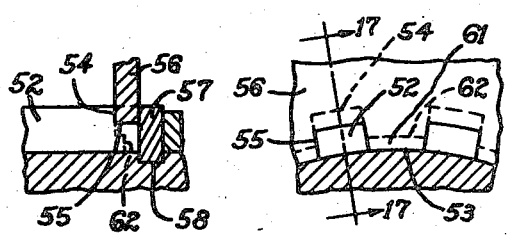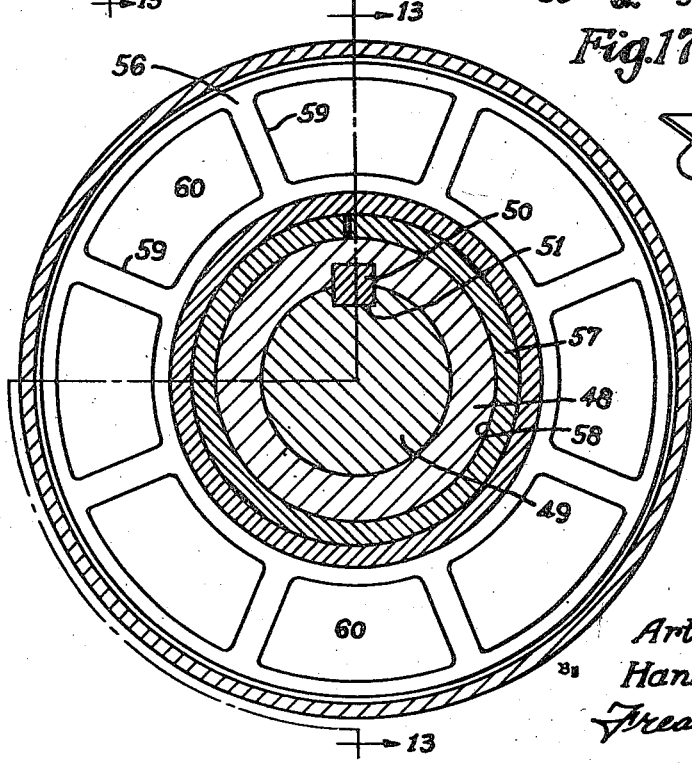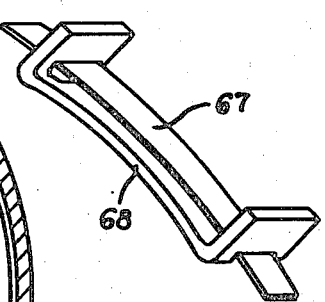

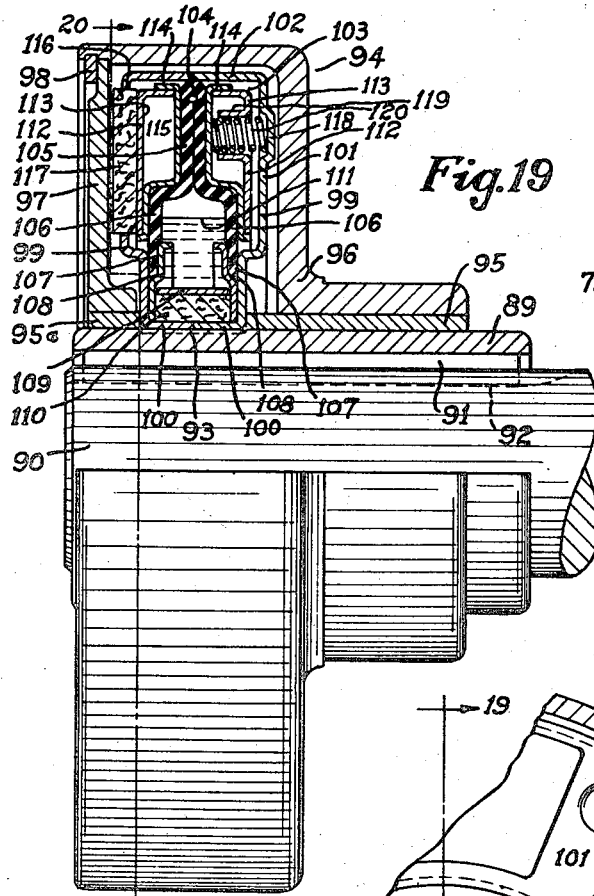
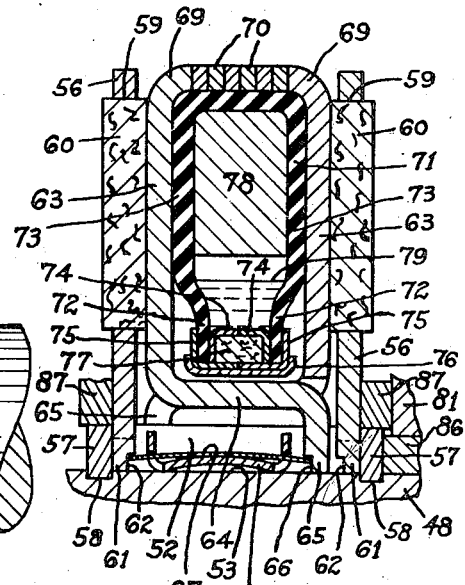
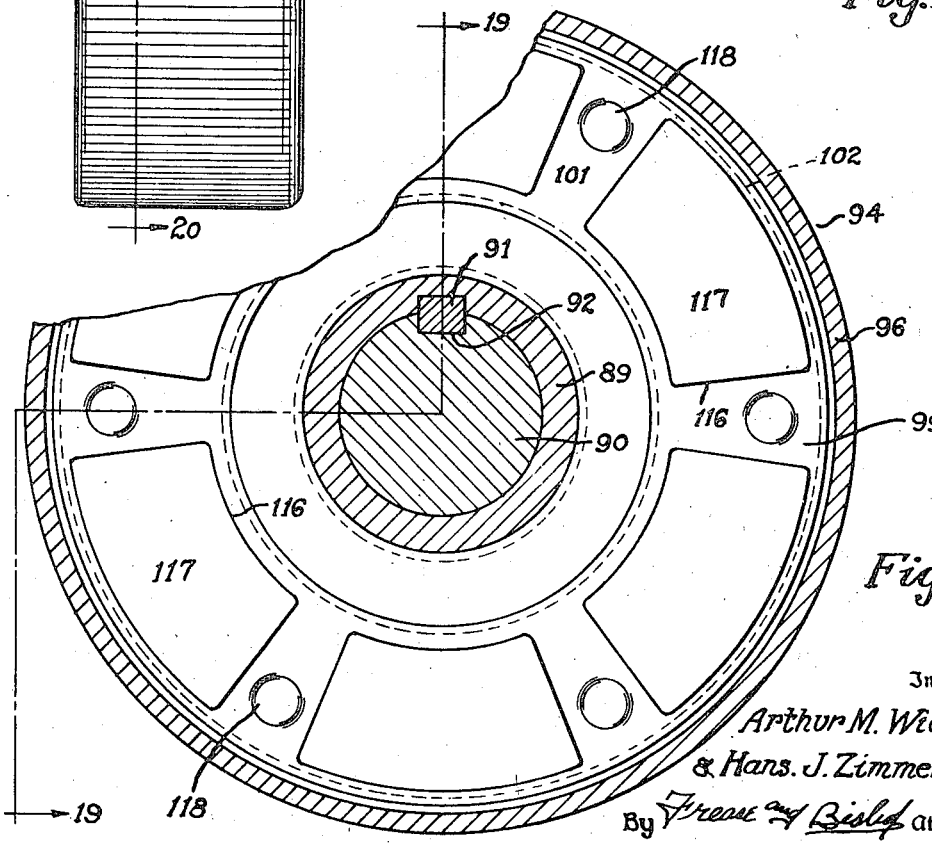

Patented Oct. 19, 1948

2,452,008

UNITED STATES PATENT OFFICE 2,452,008

MERCURY CLUTCH

Arthur M. Wickwire, Mountain Lakes, N. J., and Hans J. Zimmermann, Canton, Ohio, assignors, by mesne assignments, to Automatic Steel Products, Inc., a corporation of Delaware Application March 2, 1945, Serial No. 580,682

21 Claims. (Cl. 192—105)

The invention relates to clutches and more particularly to a liquid, preferably mercury, actuated centrifugal clutch in which axially movable members are forced into driving engagement with a driven member by the pressure of mercury contained in an annular or expansible compartment automatically upon rotation of the driving member.

There are many prior art examples of clutches of the liquid type in which a body of liquid, usually mercury, is used for effecting a driving connection between a driving member and a driven member. However, most of these constructions involve a large number of component parts, involve component parts which have a complicated design and are expensive to manufacture, involve component parts which are difficult and expensive to assemble, involve component parts which are difficult to repair, and involve constructions in which it is difficult and expensive to replace worn friction shoes.

There are many applications for small-sized liquid actuated centrifugal clutches such as in household washing machines, refrigerators, and other electrical appliances or electric motor driven devices; and in such applications, the initial cost of the clutch and the ability to repair or replace clutch parts quickly and inexpensively, are factors of utmost importance.

Accordingly, it is a primary object of the present invention to materially simplify the design, construction, assembly and repair of liquid actuated clutches.

Also, it is an object of the present invention to provide a new liquid actuated centrifugal clutch construction having relatively few parts.

Moreover, it is an object of the present invention to provide a new liquid actuated centrifugal clutch construction whose component parts are of very simplified design.

Furthermore, it is an object of the present invention to provide a new liquid actuated centrifugal clutch construction the component parts of which may be fabricated in accordance with simple and inexpensive production methods.

Also, it is an object of the present invention to provide a new liquid actuated centrifugal clutch construction which may be assembled quickly and easily in accordance with production methods and without involving prior art clutch assembly difficulties.

Furthermore, it is an object of the present invention to provide a new liquid actuated clutch construction utilizing shoes of friction material which are readily accessible, which may be renewed when worn without difficulty, and which may be manufactured at a minimum cost with a minimum scrap loss.

Also, it is an object of the present invention to provide a new liquid actuated centrifugal clutch construction formed essentially of stamped, pressed or drawn sheet metal, preferably sheet steel parts.

Furthermore, it is an object of the present invention to provide a new mercury actuated centrifugal clutch in which the mercury is contained in a compartment formed by a rubber gland of flexible, expansible or changeable shape which is easy to mold, which has a U-shape in cross-section, and which is sealed with mercury therein by rotary torque plates secured to the driving member which transfer torque directly from the driving member to the friction shoes.

Likewise, it is an object of the present invention to provide a new liquid actuated centrifugal clutch construction in which rotary torque plate means are used to transfer the torque directly from the driving member to the friction shoes, which form a compartment in which a liquid gland is located, which preferably form the seal for the liquid gland, which removably mount friction shoes for axial movement into or out of driving engagement, which house and center pressure plate means interposed between the gland and shoes, and which preferably form part of a housing for spring means controlling delayed engagement of the clutch.

Furthermore, it is an object of the present invention to provide a new liquid centrifugal clutch construction in which pressure plate means are used which are centered and mounted for movement within a housing between a liquid gland and friction shoes to distribute the pressure developed by the liquid gland to spaced friction shoe segments.

Moreover, it is an object of the present invention to provide a new liquid actuated centrifugal clutch construction in which flat friction shoe segments that may be fabricated from sheet friction material, are accessibly and removably arranged and mounted for axial movement in windows formed in the walls of rotary torque plate means that house a liquid pressure gland which actuates the shoes.

Furthermore, it is an object of the present invention to provide a new liquid actuated centrifugal clutch construction having rotary torque plate means secured to the driving member and forming a housing for a liquid gland and pressure plate means, and in which spring means are utilized controlling delayed engagement of the clutch located in compartments formed by the torque plate means and the pressure plate means.

Finally, it is an object of the present invention to provide a new liquid actuated centrifugal clutch construction in which some or all of the foregoing desiderata may be incorporated in a clutch which is simple in construction, durable and effective in operation, and extremely inexpensive to manufacture.

These and other objects and advantages apparent to those skilled in the art from the following description and claims may be obtained, the stated results achieved, and the described difficulties overcome, by the devices, constructions, arrangements, combinations, sub-combinations, parts, and elements which comprise the present invention, the nature of which is set forth in the following general statement, preferred embodiments of which—illustrative of the best modes in which applicants have contemplated applying the principles—are set forth in the following description and shown in the drawings, and which are particularly and distinctly pointed out and set forth in the appended claims forming part hereof.

The nature of the improvements of the present invention may be stated in general terms as including in a clutch wherein driving engagement between driving and driven members is established by the pressure of liquid in a liquid driving chamber, a preferably tubular hub driving member; torque plate means preferably pressed onto the hub and forming a compartment; an annular rubber gland, preferably U-shaped in cross-section, within the compartment; means for sealing the U-legs of the gland for containing liquid, preferably mercury therein; flat segmental friction shoe means carried by and rotatable with the torque plate means and mounted for movement axially of the driving member; pressure plate means mounted and centered within said compartment between the gland and torque plate means; spring means controlling delayed engagement of the clutch housed between the pressure and torque plate means; a driven member housing journaled on the tubular driving member having friction surfaces adapted to be engaged by the friction shoes; simple sleeve and washer-type bearing means interposed between driving and driven member parts; and the torque and pressure plate means and the driven member housing being formed preferably of pressed or drawn sheet metal stampings.

By way of example, preferred embodiments of the improved clutch are illustrated in the accompanying drawings forming part hereof, wherein:

Fig. 13 is an enlarged vertical section taken on the line 13—13, Fig. 15 showing a modified form of clutch incorporating some of the improvements of the present invention with the clutch parts in the position that they assume when the clutch is at rest;

Fig. 14 is a fragmentary view similar to Fig. 13 but illustrating the parts in the position that they assume when the clutch is running and engaged;

Fig. 15 is an end sectional view of the clutch taken on the line 15—15, Fig. 13;

Fig. 16 is a fragmentary sectional view taken on the line 16—16, Fig. 13;

Fig. 17 is a fragmentary section taken on the line 17—17, Fig. 16;

Fig. 18 is a perspective view of a snap acting spring used in the clutch illustrated in Figs. 13 through 16;

Fig. 18a is an enlarged view of a portion of Fig. 13;

Fig. 19 is an enlarged vertical section taken on the line 19—19, Fig. 20 showing another modified form of clutch incorporating some of the improvements of the present invention with the clutch parts in the position that they assume when the clutch is at rest; and Fig. 20 is an end sectional view of the clutch taken on the line 20—20, Fig. 19.

Similar numerals refer to similar parts throughout the various figures of the drawings.

Figure 11:
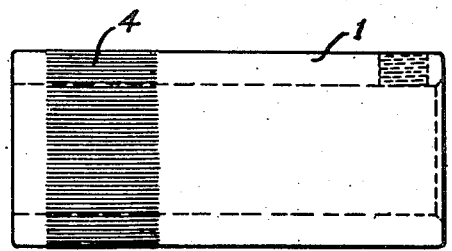
Fig. 11 is a plan view of the hub driving member prior to assembly.

An axial clutch incorporating the improvements of the present invention is illustrated in Figs. 1 through 12. The driving member includes a driving sleeve or rotor hub 1, which may be secured to a driving shaft 2 by a key (not shown) or by a set screw 3, or both. Referring particularly to Fig. 11, the member 1 is preferably a part readily fabricated from tube or bar stock and may be manufactured on an automatic or turret lathe or the like. The outer surface of the hub 1 is provided with a knurled annular zone 4 adjacent one end thereof for a purpose to be later described, and the remainder of the outer hub surface may be finished by grinding for receiving a bearing material sleeve 5.

A driven member generally indicated at 6 is journaled on the bearing sleeve 5 and preferably includes a housing member 7, a locking collar 8 and a cover member 9. The housing member 7 has a disc-like wall 10 provided with a friction shoe engaging surface 11 and an annular flange portion 12. The locking collar 8 is telescoped within the flange 12 and spot welded thereto. The cover member 9 has a hub portion 13 journaled on the bearing sleeve 5 and a disc-like portion 14 provided with a friction shoe engaging surface 15. The outer peripheral edge of the disc portion 14 of cover member 9 is provided with notches 16 through which projecting tongues 17 on the locking collar 8 extend, the tongues 17 being bent over at 18 to assemble the cover member 9 to the housing member 7.

Figure 4:
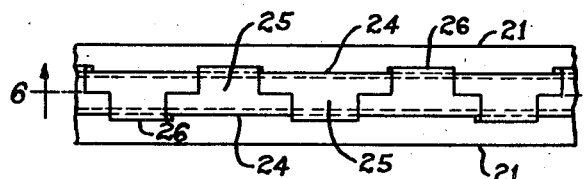
Fig. 4 is a fragmentary top plan view of the housing formed by the torque plates illustrating details of construction.
Figure 5:
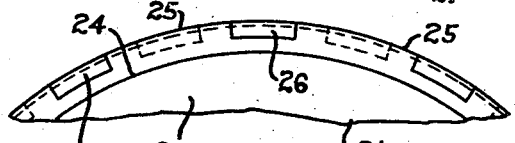
Fig. 5 is a fragmentary side elevation of the parts shown in Fig. 4.

The parts of the driven member 6 form a compartment generally indicated at 20 within which rotor or torque plates 21 are located. Each torque plate 21 includes a hub portion 22, a disc portion 23 and an outer annular stepped flange portion 24. Referring to Figs. 4 and 5, the stepped flange portions 24 are provided with spaced notched tongues 25 which permit the plates 21 to be assembled and interlocked with the tongues 25 interengaged, and the outer ends of the tongues may be bent over at 26 to lock the two torque plates 21 together and form an annular compartment 27 therebetween.

Figure 1:
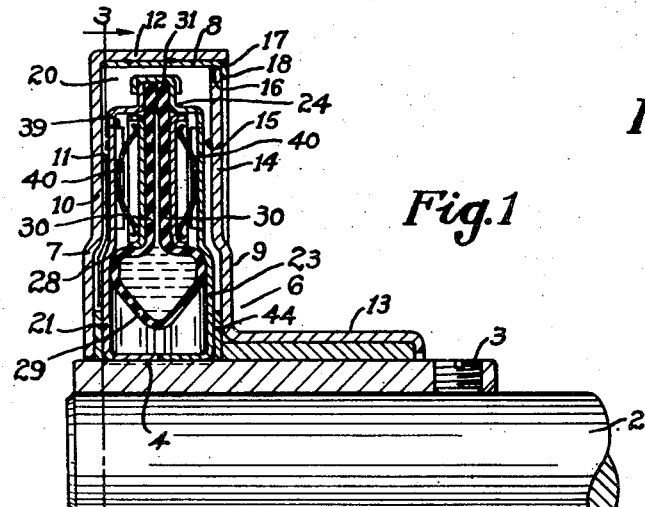
Figure 1 is an enlarged vertical section taken on the line 1—1 of Fig. 3 showing a clutch incorporating the improvements of the present invention with the clutch parts in the position that they assume when the clutch is at rest.

An annular, flexible, preferably rubber gland 28 is located within the compartment 27. The gland 28 is U-shaped in cross-section with the base of the U enlarged to V-like bulb shape 29 as shown in Fig. 1. The legs 30 of the gland extend radially outwardly and are clamped at 31 between the interengaging and interlocking stepped flange portions 24 of the plates 21 to form a liquid-tight seal. A body of mercury 32 is contained within the gland 28.

Pressure plates 33 of washer-like shape having outer annular flanges 34 and inner annular flanges 35 are located within the compartment 27 between the legs 30 of the gland 28 and the disc portions 23 of the torque plates 21.

Figure 3:
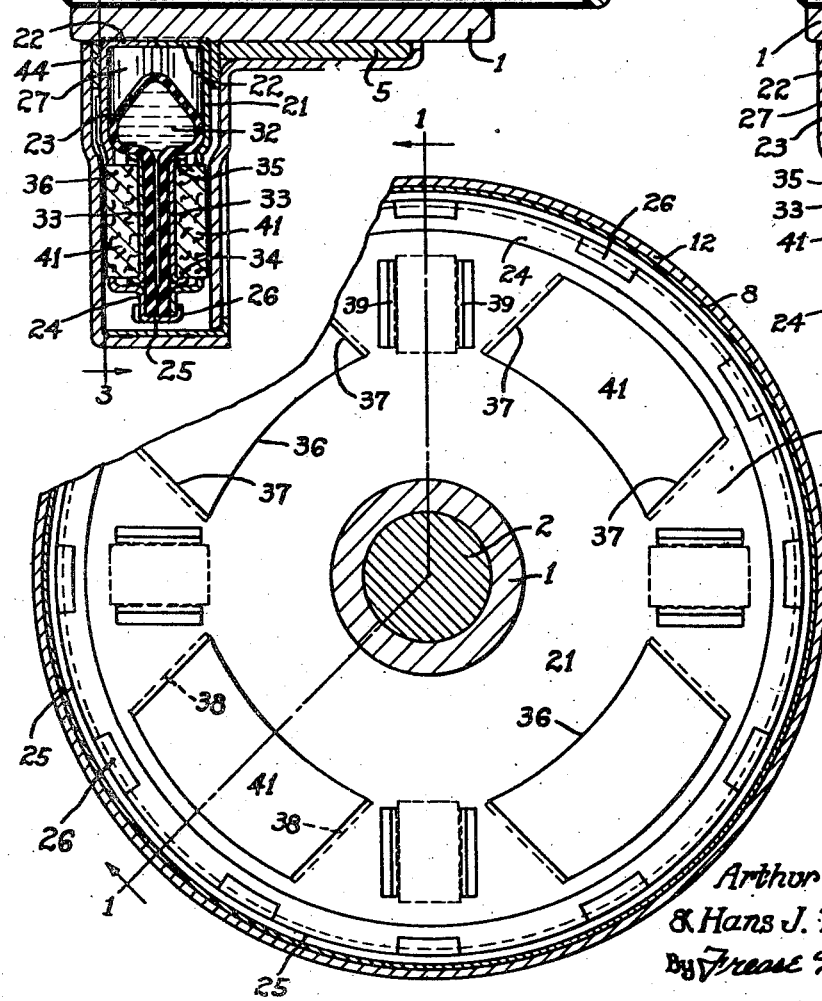
Fig. 3 is an end sectional view of the clutch taken on the line 3—3, Fig. 1.
Figure 6:
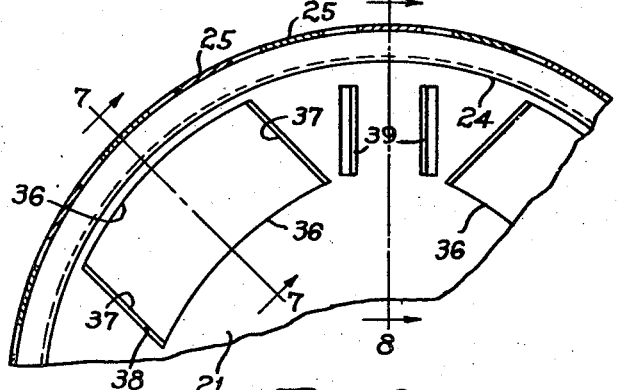
Fig. 6 is a fragmentary sectional view taken on the line 6—6, Fig. 4.
Figures 7, 8:
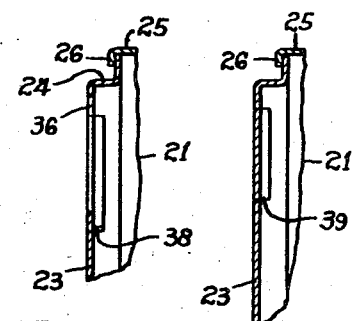
Fig. 7 is a fragmentary sectional view taken on the line 7—7, Fig. 6.
Fig. 8 is a fragmentary sectional view taken on the line 8—8, Fig. 6.
Figure 9:
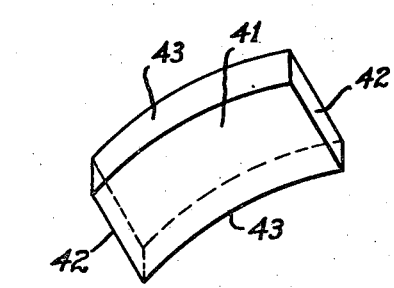
Fig. 9 is a perspective view of one of the segmental friction shoes.
Figure 10:
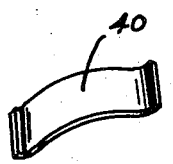
Fig. 10 is a perspective view of one of the leaf springs for controlling delayed engagement.

Referring to Figs. 3 and 6, the disc walls 23 of the torque plates 21 are each provided with a plurality of windows 36, and the generally radial and parallel edges 37 thereof are formed by preferably parallel inturned flanges 38. The annular edges of the windiws 36 are preferably formed on the same curvature. In between adjacent windows 36, pairs of inturned tongues 39, illustrated in Figs. 6 and 8, are struck from the disc portion 23 of the torque plates 21; and each pair of tongues 39 cooperate with the flanges 34 and 35 on the pressure plates 33 to form a spring retaining compartment.

A leaf spring 40 is located in each spring-containing compartment normally operative to retain the pressure plates 33 in contact with the legs 30 of the gland 28. Flat segmental friction shoes 41 formed of any desired friction material, and having the same external shape as the shape of the windows 36, are located in the windows 36. By providing the friction shoes 41 with parallel side edges 42 and with top and bottom edges 43 having the same curvature, the friction shoes 41 may be cut from sheets of friction material without any waste. The friction shoes 41 have no direct connection with any of the other parts of the clutch, but float in the windows 36 provided in the torque plates 21.

Thrust bearing washers 44 are interposed between inner surfaces of the driven member housing 6 and the outer surfaces of the torque plates 21 to locate the driven member housing 6 axially of the sleeve 1.

Parts 7, 8 and 9 of the driven member, torque plates 21 and pressure plates 33 are each preferably formed as sheet metal stampings, such as sheet steel stampings, thus providing for the manufacture thereof in a simplified manner using production methods.

The separate parts of the clutch are each fabricated and may then be assembled as follows: The gland 28, two pressure plates 33 and the required number of springs 40 are placed between two torque plates 21, and the tongues 25 of the torque plates 21 are telescoped. The gland 28 is filled with mercury, and the tongue bends 26 are formed to provide the seal 31 for the gland and assemble the parts as a unitary assembly.

This assembly is then pressed onto the hub 1 over the knurled zone 4 thereof. Thus, the hub portions 22 of the torque plates 21 are securely held fixed on the knurled portion 4 of the hub 1 so that the assembly rotates with and becomes part of the driving member hub 1. Although the joint between the hub portions 22 and hub 1 has been described as including a knurled surface 4, the knurled surface 4 may be omitted and a press fit used in assembling the parts.

The thrust washers 44 and bearing sleeve 5 may then be assembled on the hub 1; and friction shoe segments 41 are inserted in windows 36. The housing member 7 to which a locking collar 8 has been spot welded, and a cover member 9 are then assembled on the hub 1; and the tongues 17 are bent at 18 to complete the assembly of the driven member 6.

The tension of the springs 40 may be only sufficient to maintain the clutch parts approximately in the position shown in Fig. 1 when the clutch is at rest; or the springs may have sufficient tension to prevent driving engagement when the driving member is operating at below a certain predetermined speed. For instance, a motor for an electrical appliance may normally operate at 1800 R. P. M. and it may not be desired to have clutch engagement when the motor is operating below 1400 R. P. M. when the starting windings of the motor may be connected. The springs, therefore, may have sufficient tension to prevent engagement at below 1400 R. P. M.

The construction and arrangement of the U-shaped rubber gland 28 is likewise such as to provide an inertia or time delayed engagement, as described and claimed in the copending Wickwire application Serial No. 606,741, filed July 24, 1945.

Figure 2:
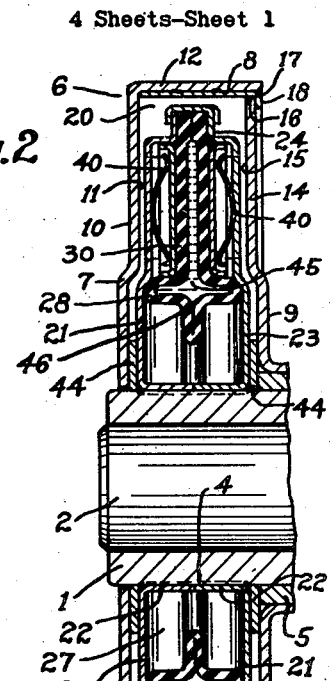
Fig. 2 is a view similar to Fig. 1 but illustrating the parts in the position that they assume when the clutch is running and engaged.

The operation of the clutch is illustrated in Figs. 1 and 2 wherein Fig. 1 shows the parts when the clutch is at rest and Fig. 2 shows the parts when the clutch is engaged. As the driving member comes up to speed, the body of mercury 32 contained within the V-bulb 29 of the gland 28 is thrown outward by centrifugal force to the position shown in Fig. 2 forming a liquid annulus 45, the pressure of which spreads the gland legs 30 apart. These gland legs press against the pressure plates 33 forcing them apart axially, compressing the springs 40, and moving the floating friction shoes 41 axially to positions wherein their outer surfaces engage the friction surfaces 11 and 15 of the driven member 6, thereby engaging the clutch as shown in Fig. 2. Since the rubber gland 28 is completely filled with mercury when the clutch is at rest, the V-bulb portion 29 collapses when the clutch is engaged approximately to the shape indicated at 46 in Fig. 2. The V-bulb reservoir portion 29 of the gland 28 has flat sides or collapsing surfaces so as to permit ready collapse under external air pressure when the mercury is thrown outward to form the annular mercury ring 45.

In accordance with the present invention, the clutch construction is materially simplified. Thus, the seal 31 of the U-shaped liquid gland 28 is formed as a part of the torque plate assembly which encloses the gland and transmits torque from the driving member 1 to the friction shoes 41. The necessity of providing a splined connection between parts of the driving member is eliminated by pressing the torque plates 21 upon the hub 1 and by providing the pressure plates 33.

The pressure plates 33 in turn uniformly transfer the pressure developed by the gland 28 to the segmental friction shoes 41.

The spring means controlling delayed engagement are housed in compartments provided by formations on the pressure plates 33 and torque plates 21.

The windows 36 in the torque plates 21 provide for slidably axially mounting and removably receiving the floating friction shoes 41; and the friction shoes 41 may be readily assembled or removed without any riveting, or special fitting. Thus, when worn, the friction shoes 41 may be renewed merely by disassembling the driven member 6. A good bearing surface is formed by the flanges 37 for transmitting torque from the torque plates 21 to the friction shoes 41.

Accordingly, the number of clutch parts is reduced, each of the clutch parts has a simplified construction and shape which may be readily fabricated by production methods with a minimum of scrap loss, and the parts are readily assembled, repaired or replaced.

Figure 12:
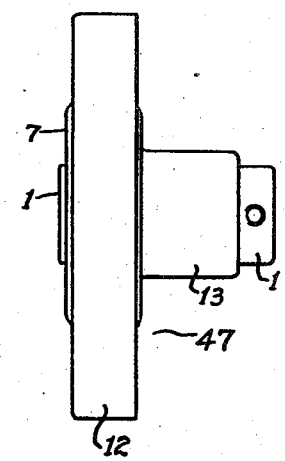
Fig. 12 is a side elevation of the clutch illustrated in Figs. 1 through 11.

These features are very advantageous in the manufacture of small sized clutches such as indicated generally at 47 in Fig. 12 for use in household electrical appliances, such as washing machines. However, the application of the improved clutch construction features of the present invention is not limited to small sized clutches, as clutches of various sizes may be constructed as shown in Figs. 1 through 11.

Likewise, it is not necessary to incorporate all of the improved features in a clutch for proper operation thereof. Thus, modified forms of improved clutch construction are shown in Figs. 13 through 20 incorporating substantially all of the features of the present improvements.

Referring to Figs. 13 through 18, the clutch includes a driving member hub 48 secured to a driving shaft 49 by a key 50 engaged in keyway 51 in shaft 49. One end of the hub 48 is provided with spline ribs 52 forming intervening spline grooves 53; and the ends of the ribs 52 are notched at 54 (Figs. 16 and 17) forming shoulders which receive notches 55 formed about the periphery of the central opening in torque plates 56. The torque plates 56 are assembled on hub 48 with the notches 55 engaged by the shouldered spline ribs 52—54 and are held in position by snap rings 57 seated in annular grooves 58 formed in the periphery of the hub 48.

Windows 59 are formed in torque plates 56 receiving friction shoe segments 60 and forming a floating mounting therefor. The torque plate tongues 61 between notches 55 are located in the spline grooves 53 and have recesses 62 formed therein. Pressure plates 63 having spaced inner L-shaped flange portions 64 are located between the torque plates 56; and the flange portions 64 are spaced so as to interfit and interlock when the pressure plates 63 are assembled as shown in Fig. 13. The tongue ends 65 of the spaced flange portions 64 project into the spline grooves 53 and are notched at 66. A snap acting spring is located at each spline groove 53 including a leaf spring member 67 and a spring retainer 68. The ends of each spring 67 are engaged, one end in a notch 62 in one torque plate 56 and the other end in a notch 66 in one pressure plate flange tongue 65.

Referring to Fig. 18, the leaf spring 67 is shown flexed slightly convex upwardly, in which position it is retained by the spring retainer 68. Before assembly with the spring retainer 68, spring 67 would normally be flexed concave upwardly. The pressure plates 63 are provided with outer curved annular flanges 69, and when assembled, a series of thin rings 70 are located between the flange edges 69 of the two pressure plates 63. An annular compartment is thus formed between the pressure plates 63, the flanged portions 64 thereof, and the rings 70.

A U-shaped annular rubber gland 71 is located within the compartment having the inner ends 72 of its legs 73 clamped by inner flanged rings 74, outer flanged rings 75 and clamping ring 76. A felt ring 77 is located within the inner flanged rings 74 so that members 74, 75, 76 and 77 form a mercury-tight seal for the gland 71. An annular filler ring 78 is located within the gland 71 preventing collapse thereof and normally confining a body of mercury 79 within the gland 71 in an annular mercury ring surrounded by the filler ring 78.

The driven member is generally indicated at 80 and includes a hub member 81, a housing member 82 and a cover member 83. The members 81 and 82 are preferably brazed at 84 and the cover member 83 is locked to the housing member 82 by a snap ring 85. A sleeve bearing 86 mounts the hub member 81 on the driving member hub 48 and thrust washers 87 may be interposed between the torque plates 56 and the driven member parts 81 and 83.

Torque plates 56, pressure plate 63, seal rings 74, 75 and 76 and the spring retainer 68 may be formed as sheet metal stampings, as shown. The driving member parts 81, 82 and 83 are not shown as stampings but a driving member housing formed of stamped parts such as illustrated in Fig. 1 may be used for the clutch of Figs. 13 to 18, if desired.

The operation of the clutch is illustrated in Figs. 13 and 14 wherein Fig. 13 shows the parts when the clutch is at rest and Fig. 14 shows the parts when the clutch is engaged. As the driving member comes up to speed, the body of mercury contained within the gland 71 is thrown outward by centrifugal force to the position shown in Fig. 14, expanding the legs 73 of the gland, and forcing the pressure plates 63 axially away from each other. Thus the floating friction shoes 60 are moved to positions wherein their outer surfaces engage the inner surfaces of the driven member 80, thereby engaging the clutch as shown in Fig. 14.

Although the gland 71 is not necessarily completely filled with mercury, the construction of the seal including the felt ring 77 and an imperfect fit between the edges of the rings 74, 75 and 76 permit the interior of the gland 71 to breathe, since mercury will not pass through felt when the mercury is not under pressure. When mercury contacts the seal parts when the clutch is at rest, it is not under pressure; and when the mercury is under pressure with the clutch running and engaged, the mercury does not contact the parts of the seal.

When the clutch is engaged, and the gland 71 is expanded by the mercury pressure, as shown in Fig. 14, the base wall 88 of the U-shaped gland is stretched axially, and the sustaining rings 70 prevent radial expansion of the wall 88. The total stretch in the wall 88 is divided equally by the rings 70; and the spacing between each pair of adjacent rings 70, occasioned by the axial stretch of the gland wall 88 when the clutch is engaged, is extremely small.

Movement of either of the pressure plates 63 to clutch engaging position moves the tongue ends 65 toward a torque plate 56 and reduces the distance between the recesses 62 and 66 which confine the ends of the springs 67. Initially, when the clutch is at rest, the leaf springs 67 are nearly flat and offer high resistance to movement of the pressure plates 63 toward the torque plates 56. However, as such movement continues, and the distance in the spring compartments between the ends of the leaf springs 67 becomes smaller, each spring flexes more convex upwardly (viewing the top spring in Fig. 13) and finally collapses with a snap action to the position shown in Fig. 14. In this manner, the engagement of the clutch is not gradual but sudden, due to the snap action of the springs 67.

The specific arrangement of the U-shaped rubber gland and the seal therefore shown and described in connection with Figs. 13 through 18, but not claimed herein, is claimed in the copending Hans J. Zimmermann application Serial No. 538,869, filed June 5, 1944 (Patent No. 2,400,586); and the multiple rings 70 for supporting an axially expansible rubber gland against radial expansion shown and described in connection with Figs. 13 through 18, but not claimed herein, is claimed in the copending application of Hans J. Zimmermann, filed May 26, 1945, Serial No. 596,031, now abandoned.

In accordance with the present invention, the clutch construction of Figs. 13 through 18 is materially simplified to provide a durable construction for large sized clutches composed of parts which may be readily fabricated with a minimum of scrap loss and readily assembled, repaired or replaced. Thus, although a spline arrangement is used, torque is transmitted directly from the hub 48 through the torque plates 56 fixed on the hub 48 to the friction shoes 60, just as in the Fig. 1 construction; and there is no axial sliding movement of the torque plates 56 along the hub splines to cause wear or failure of the torque plate mounting. The sliding-mounting of the pressure plates 63 on the hub splines does not involve wear of these parts because no torque load is transmitted from the hub 48 through the pressure plates 63. The pressure plates 63 only transfer axial pressure developed by the gland uniformly to the segmental friction shoes 60.

The construction illustrated in Fig. 13, like the construction illustrated in Fig. 1, includes spring means controlling delayed engagement of the clutch housed in compartments provided by formations on the pressure plates 63 and torque plates 56; and includes flat friction shoes 60 mounted in windows formed in the torque plates 56 without any riveting, or special fitting. Thus, the friction shoes may be readily renewed by merely disassembling the driven member 80.

The modified clutch construction illustrated in Figs. 19 and 20 includes a driving member hub 89 secured to a driving shaft 90 by a key 91 engaged in a keyway 92 in the shaft 90. The driving member hub 89 may be fabricated from tube or bar stock and its outer surface is provided with a knurled annular zone 93 adjacent one end thereof. A driven member indicated at 94 is journaled on the bearing sleeves 95 and 95a and preferably includes a housing member 96 and a cover member 97 assembled by a snap ring 98.

Torque plates 99 including inner annular hub flanges 100, disc wall portions 101, and outer annular flanges 102 are mounted on the hub 89 by pressing the hub flange portions 100 onto the knurled portion 93 of the hub 89 thereby forming an annular compartment 103 between the torque plates 99.

An annular flexible, preferably rubber, gland 104 is located within the compartment 103. The gland 104 again is U-shaped in cross-section with legs 105 offset at 106 and having their inner ends 107 clamped by rings 108 against the torque plates 99. A spacer sleeve 109 extends between the clamping rings 108, and a felt ring 110 is interposed between the sleeve 109 and the hub flanges 100 of the torque plates 99. Thus, a mercury-tight seal for the gland 104 is provided similar to that illustrated in Fig. 13, which permits the annular compartment containing a body of mercury 111 to breathe without loss of mercury. The seal, however, is formed by the torque plates 99 as in the construction of Fig. 1, and not separately as in Fig. 13.

Pressure plates generally indicated at 112 are located within the compartment 103 between the legs 105 of the gland 104 and the disc portions 101 of the torque plates 99. The pressure plates 112 are each preferably composed of two annular flanged washer-like stampings 113 and 114 telescopically assembled to provide hollow annular compartments 115.

The disc walls 101 of the torque plates 99 are each provided with a plurality of windows 116, which may be formed in the same manner as the windows in the clutch of Fig. 1 with parallel generally radial flanged edges; or the edges may be truly radial and omit the flanges as shown in Fig. 20. Flat segmental friction shoes 117 formed of any desired frictional material, and having the same shape as the windows 116 are located, mounted and float in the windows 116.

In between adjacent windows 116, the torque plates 99 are formed with spring receiving recesses 118; and the pressure plates 112 are also formed with spring containing portions 119 to receive helical springs 120 reacting between pressure plates 112 and torque plates 99.

Parts 99, 108, 109, 113 and 114 may be each formed from sheet metal preferably sheet steel as stampings and the like, thus providing for the manufacture thereof in a simplified manner. Although the driven member housing 94 is not shown as being formed of stampings, it may be so formed in a manner similar to the construction illustrated in Fig. 1.

The separate parts of the clutch are each fabricated and may then be assembled as follows: The rubber gland 104 is filled with mercury. The gland 104, clamping rings 108, spacer ring 109, felt ring 110, pressure plates 112 and springs 120 are placed between two torque plates 99 and the torque plates 99 are then pressed onto the knurled zone 93 of the hub 89 so that the assembly rotates with and becomes part of the driving member. Bearings 95 and 95a are then assembled on the hub, friction shoe segments 117 are inserted in the windows 116, and the driven member housing 94 is assembled on the hub to complete the clutch assembly.

In operation, as the driving member comes up to speed, the body of mercury 111 contained in the gland 104 is thrown outward by centrifugal force to axially expand the gland leg portions 105 axially. The pressure of the mercury which spreads the gland leg portions 105 apart in turn forces the pressure plates 112 apart axially, compressing springs 120 and moving the floating friction shoes 117 to positions wherein their outer surfaces engage the inner surfaces of the driven member 94 thereby engaging the clutch.

The clutch construction of Figs. 19 and 20 is specially adapted for large sized clutches but involves all of the advantages or features of the clutch of Fig. 1. The differences in detailed construction relate merely to providing an inner rather than an outer gland seal and to the use of helical rather than leaf springs. The annular compartments 115 in the pressure plates 112 protect the rubber gland 104 from heat which may be developed at the friction shoes during clutch operation.

The clutch of Figs. 19 and 20, like the other clutches described above includes parts having a simplified construction and shape which may be readily fabricated by production methods with a minimum of scrap loss, and the parts may be readily assembled, repaired, or replaced.

The arrangement of the U-shaped rubber gland 71 in the clutch of Fig. 13, and of the U-shaped rubber gland 104 in the clutch of Fig. 19, like that of the gland 28 of the clutch of Fig. 1, in each instance is such as to provide for an inertia or time delayed engagement of the clutch as described in the copending Wickwire application Serial No. 606,741.

Likewise, each of the clutches of Figs. 1, 13 and 19, incorporates the principle described and claimed in the copending Hans J. Zimmermann application Serial No. 538,869, matured in Patent No. 2,400,586, of using a body of mercury having an extremely high head to thickness ratio when thrown outward by centrifugal force to develop the clutch engaging pressure. This thin column of mercury having a relatively large head is well shown in Figs. 2 and 14. Thus only a relatively small amount of mercury is necessary for operating the clutches above described.

Accordingly, the present invention provides an improved mercury actuated centrifugal clutch construction which overcomes the disadvantages and difficulties of prior art clutches: which uses flat friction shoe segments that may be fabricated from sheet friction material with a minimum of scrap loss and which are accessibly and removably arranged and mounted for ready replacement or repair; which may be constructed with the simplest of parts by the simplest of operations; and which is durable effective and reliable in use and relatively inexpensive to manufacture.

The embodiments of the present invention illustrated and described herein are by way of example and the scope of the present invention is not limited to the exact details of construction of the various parts.

For instance, the liquid used is preferably mercury because of the many advantages accruing by use of this particular liquid which has a very high specific gravity, is stable under normal operating conditions, and is unaffected by and does not affect the working parts which it contacts. However, other high specific gravity liquids may be used in the clutches of the present invention without affecting their operation.

Finally, in the foregoing description, certain terms have been used for brevity, clearness and understanding; but no unnecessary limitations are to be implied therefrom beyond the requirement of the prior art, because such words are utilized for descriptive purposes herein and not for the purpose of limitation, and are intended to be broadly construed.

Having now described the features of the invention, the construction, operation and use of preferred embodiments thereof, and the advantageous, new and useful results attained by the improved constructions; the new and useful devices, constructions, arrangements, combinations, sub-combinations, parts and elements, and reasonable mechanical equivalents thereof, obvious to those skilled in the art are set forth in the appended claims.

We claim:

1. In a liquid actuated clutch wherein driving engagement between driving and driven members is established upon rotation of one of the members by liquid thrown centrifugally outwardly in a chamber formed in one of the members— a flexible liquid containing gland, means confining a body of liquid within said gland, a rotatable driving member including torque plate means adjacent the gland fixed to the driving member for rotation therewith, there being windows formed in the torque plate means, friction shoe segments carried in said windows for axial movement relative to the torque plate means, pressure plate means interposed between the gland and friction shoe means, and a driven member housing having an engaging surface adjacent the friction shoe means.

2. In a liquid actuated clutch wherein driving engagement between driving and driven members is established upon rotation of one of the members by liquid thrown centrifugally outwardly in a chamber formed in one of the members—a flexible liquid containing gland, means confining a body of liquid within said gland, a rotatable driving member including torque plate means adjacent the gland fixed to the driving member for rotation therewith, friction shoe means driven by the torque plate means and movable relatively thereto, pressure plate means interposed between the gland and torque plate means and engaging the gland and friction shoe means for movement therewith relative to the torque plate means, and a driven member housing having an engaging surface adjacent the friction shoe means.

3. In a liquid actuated clutch wherein driving engagement between driving and driven members is established upon rotation of one of the members by liquid thrown centrifugally outwardly in a chamber formed in one of the members—an axially expansible liquid containing gland, means confining a body of liquid within said gland, a rotatable driving member including torque plate means adjacent the gland fixed to the driving member for rotation therewith, axially movable friction shoe means driven by the torque plate means, axially movable pressure plate means interposed between the gland and torque plate means and engaging the gland and friction shoe means, and a driven member housing having an engaging surface adjacent the friction shoe means engaged by the friction shoe means when the gland is axially expanded.

4. In a liquid actuated clutch wherein driving engagement between driving and driven members is established upon rotation of one of the members by liquid thrown centrifugally outwardly in a chamber formed in one of the members—a flexible liquid containing gland, means confining a body of liquid within said gland, a rotatable driving member including torque plate means adjacent the gland fixed to the driving member for rotation therewith, friction shoe means driven by the torque plate means and movable relatively thereto, pressure plate means interposed between the gland and torque plate means and engaging the gland and friction shoe means, spring means reacting between the torque plate means and pressure plate means, and a driven member housing having an engaging surface adjacent the friction shoe means.

5. In a liquid actuated clutch wherein driving engagement between driving and driven members is established upon rotation of one of the members by liquid thrown centrifugally outwardly in a chamber formed in one of the members—a flexible liquid containing gland, means confining a body of liquid within said gland, a rotatable driving member including torque plate means adjacent the gland fixed to the driving member for rotation therewith, flat friction shoe segments carried by the torque plate means and mounted for floating axial movement with respect to the torque plate means, pressure plate means interposed between the gland and torque plate means and engaging the gland and friction shoes, and a driven member housing having an engaging surface adjacent the friction shoes.

6. In a liquid actuated clutch wherein driving engagement between driving and driven members is established upon rotation of one of the members by liquid thrown centrifugally outwardly in a chamber formed in one of the members—a flexible U-shaped annular gland, a rotatable driving member including torque plate means adjacent the gland fixed to the driving member for rotation therewith, means on the torque plate means clamping the legs of the gland U at the outer periphery thereof to form an annular chamber within the gland, a body of liquid in said chamber, friction shoe means driven by the torque plate means and movable relatively thereto, pressure plate means interposed between the gland and friction shoe means, and a driven member housing having an engaging surface adjacent the friction shoe means.

7. In a liquid actuated clutch wherein driving engagement between driving and driven members is established upon rotation of one of the members by liquid thrown centrifugally outwardly in a chamber formed in one of the members—a rotatable driving member including a plurality of torque plates fixed to the driving member for rotation therewith, the torque plates having outer annular flanges forming a compartment, a flexible liquid containing gland within said compartment, means confining a body of liquid within said gland, friction shoe means driven by the torque plates and movable relatively thereto, pressure plate means within the compartment between the gland and friction shoe means, and a driven member housing surrounding the torque plates having engaging surfaces adjacent the friction shoe means.

8. In a liquid actuated clutch wherein driving engagement between driving and driven members is established upon rotation of one of the members by liquid thrown centrifugally outwardly in a chamber formed in one of the members—a flexible liquid containing gland, means confining a body of liquid within said gland, a rotatable driving member hub, spaced flanged torque plates pressed onto the hub surrounding the gland, friction shoe means driven by the torque plates and movable relatively thereto, pressure plate means interposed between the gland and torque plates and engaging the gland and friction shoe means, and a driven member housing having an engaging surface adjacent the friction shoe means.

9. In a liquid actuated clutch wherein driving engagement between driving and driven members is established upon rotation of one of the members by liquid thrown centrifugally outwardly in a chamber formed in one of the members—a flexible liquid containing gland, means confining a body of liquid within said gland, a rotatable driving member including torque plate means adjacent the gland fixed to the driving member for rotation therewith, friction shoe means driven by the torque plate means and movable relatively thereto, pressure plate means interposed between the gland and torque plate means and engaging the gland and friction shoe means, means on the torque plate means and on the pressure plate means forming spring containing compartments between the pressure plate means and torque plate means, spring means reacting between the torque plate means and pressure plate means housed in said compartments, and a driven member housing having an engaging surface adjacent the friction shoe means.

10. In a liquid actuated clutch wherein driving engagement between driving and driven members is established upon rotation of one of the members by liquid thrown centrifugally outwardly in a chamber formed in one of the members—a flexible liquid containing gland, means confining a body of mercury within said gland, a rotatable driving member including torque plate means adjacent the gland fixed to the driving member for rotation therewith, friction shoe means driven by the torque plate means and movable relatively thereto, pressure plate means interposed between the gland and friction shoe means, spaced annular flanges formed on the pressure plate means, a series of pairs of spaced flanges projecting from the torque plate means and forming with said annular flanges a series of spring containing compartments, spring means reacting between friction shoe means and pressure plate means housed in said compartments, and a driven member housing having an engaging surface adjacent the friction shoe means.

11. In a liquid actuated clutch wherein driving engagement between driving and driven members is established upon rotation of one of the members by liquid thrown centrifugally outwardly in a chamber formed in one of the members—a flexible liquid containing gland, means confining a body of liquid within said gland, a rotatable driving member including torque plate means adjacent the gland fixed to the driving member for rotation therewith, there being flanged window openings formed in said torque plate means, friction shoe means mounted for floating movement in said window openings, pressure plate means interposed between the gland and friction shoe means, and a driven member housing having an engaging surface adjacent the friction shoe means.

12. In a liquid actuated clutch wherein driving engagement between driving and driven members is established upon rotation of one of the members by liquid thrown centrifugally outwardly in a chamber formed in one of the members—a rotatable driving member including two spaced torque plates fixed to the driving member for rotation therewith and forming a compartment, a flexible U-shaped annular gland within said compartment, interengaging means formed at the periphery of the torque plates locking the torque plates together and clamping the U-legs of said gland to form a chamber within the gland, a body of liquid within said chamber, friction shoe means driven by the torque plates and movable relatively thereto, pressure plate means interposed between the gland and friction shoe means, and a driven member housing having an engaging surface adjacent the friction shoe means.

13. In a liquid actuated clutch wherein driving engagement between driving and driven members is established upon rotation of one of the members by liquid thrown centrifugally outwardly in a chamber formed in one of the members—a flexible liquid containing gland, means confining a body of liquid within said gland, a rotatable driving member including two spaced flanged torque plates enclosing the gland fixed to the driving member for rotation therewith, friction shoe means driven by the torque plates and movable relatively thereto, flanged pressure plates centered by the torque plates interposed between the gland and friction shoe means, and a driven member housing having an engaging surface adjacent the friction shoe means.

14. In an axial mercury actuated clutch wherein driving engagement between driving and driven member is established upon rotation of the driving member by mercury thrown centrifugally outwardly in a chamber formed in the driving member—an axially expansible U-shaped annular gland, means confining a body of mercury within said gland, a rotatable driving member hub, two flanged torque plates pressed onto the hub enclosing the gland, flat friction shoe segments driven by the torque plates and axially movable relatively thereto, ring-like pressure plates interposed between the gland and friction shoe segments, and a driven member housing surrounding the friction shoes and having engaging surfaces adjacent the friction shoes.

15. In an axial mercury actuated clutch wherein driving engagement between driving and driven members is established upon rotation of the driving member by mercury thrown centrifugally outwardly in a chamber formed in the driving member—a rotatable driving member including two spaced torque plates fixed to the driving member for rotation therewith and forming an annular compartment, a U-shaped annular rubber gland in said compartment, means on the torque plates clamping the gland legs to form a mercury-tight chamber, a body of mercury in said chamber, axially movable friction shoe means driven by the torque plates, axially movable pressure plate means in the compartment between the gland and friction shoe means, and a driven member housing surrounding the torque plates having engaging surfaces adjacent the friction shoe means.

16. In an axial mercury actuated clutch wherein driving engagement between driving and driven members is established upon rotation of the driving member by mercury thrown centrifugally outwardly in a chamber formed in the driving member—a rotatable driving member including two spaced torque plates fixed to the driving member for rotation therewith and forming an annular compartment, a U-shaped annular rubber gland in said compartment, means on the torque plates clamping the gland legs to form a mercury-tight chamber, a body of mercury in said chamber, axially movable friction shoe means driven by the torque plates, axially movable pressure plate means in the compartment between the gland and friction shoe means, spring means housed and reacting between the torque plates and pressure plate means, and a driven member housing sourrounding the torque plates having engaging surfaces adjacent the friction shoe means.

17. In a liquid actuated clutch wherein driving engagement between driving and driven members is established upon rotation of one of the members by liquid thrown centrifugally outwardly in a chamber formed in one of the members—a flexible liquid containing gland, means confining a body of liquid within said gland, a rotatable driving member including two sheet metal torque plates adjacent the gland fixed to the driving member for rotation therewith, friction shoe means driven by the torque plates and movable relatively thereto, sheet metal pressure plates interposed between the gland and friction shoe means, a driven member housing formed of a plurality of interengaged sheet metal members having shoe engaging surfaces adjacent the friction shoe means, and the sheet metal torque plates, pressure plates and driven member housing members being formed as sheet metal stampings.

18. In a liquid actuated clutch wherein driving engagement between driving and driven members is established upon rotation of one of the members by liquid thrown centrifugally outwardly in a chamber formed in one of the members—a tubular hub driving member, flanged torque plates pressed onto the hub and forming a compartment, a U-shaped annular rubber gland within the compartment, means sealing the legs of the gland U to form an annular chamber within the gland, a body of mercury in said chamber, flat friction shoe segments driven by and rotatable with the torque plates and mounted for movement axially thereof, pressure plates mounted and centered within said compartment between the gland and torque plates, spring means controlling delayed engagement of the clutch housed between the pressure plates and torque plates, and a driven member housing journaled on the hub driving member having friction surfaces adapted to be engaged by the friction shoes.

19. In a liquid actuated clutch wherein driving engagement between driving and driven members is established upon rotation of one of the members by liquid thrown centrifugally outwardly in a chamber formed in one of the members—a flexible U-shaped annular gland, the base of the U being formed to V-shape, means sealing the legs of the gland U to form an annular chamber within the gland, a body of liquid in said chamber, a rotatable driving member including torque plate means adjacent the gland fixed to the driving member for rotation therewith, friction shoe means driven by the torque plate mean and movable relatively thereto, pressure plate means interposed between the gland and friction shoe means, and a driven member housing having an engaging surface adjacent the friction shoe means.

20. In a liquid actuated clutch wherein driving engagement between driving and driven members is established upon rotation of one of the members by liquid thrown centrifugally outwardly in a chamber formed in one of the members—a flexible U-shaped annular gland, means sealing the legs of the gland U to form an annular chamber within the gland, the base of the U forming an annular reservoir portion having substantially flat surfaces readily collapsible under external pressure, a body of liquid in said chamber, a rotatable driving member including torque plate means driven by the driving member, friction shoe means driven by the torque plate means, pressure plate means interposed between the gland and friction shoe means, and a driven member housing having an engaging surface adjacent the friction shoe means.

21. In a liquid actuated clutch wherein driving engagement between driving and driven members is established upon rotation of one of the members by liquid thrown centrifugally outwardly in a chamber formed in one of the members—an axially expansible flexible U-shaped annular gland, the gland having reservoir wall portions and leg portions, means sealing the legs of the gland U to form an annular chamber within the gland, the reservoir wall portions being so constructed and arranged as to permit ready collapse under external pressure, a body of liquid in said chamber, a rotatable driving member including axially movable friction members driven by the driving member, axially movable pressure plate means interposed between the gland and friction members, and a driven member having friction engaging surfaces adjacent the friction members.

ARTHUR M. WICKWIRE.
HANS J. ZIMMERMANN.

REFERENCES CITED

The following references are of record in the file of this patent:

UNITED STATES PATENTS

| Number | Name | Date |
| --- | --- | --- |
| 1,618,643 | Dickson | Feb. 22, 1927 |
| 1,857,017 | Gotz | May 3, 1932 |
| 2,400,586 | Zimmermann | May 21, 1946 |